S. CAMPBELL.
RESILIENT WHEEL.
APPLICATION FILED JUNE 12, 1917.
1,275,526. Patented Aug. 13, 1918.
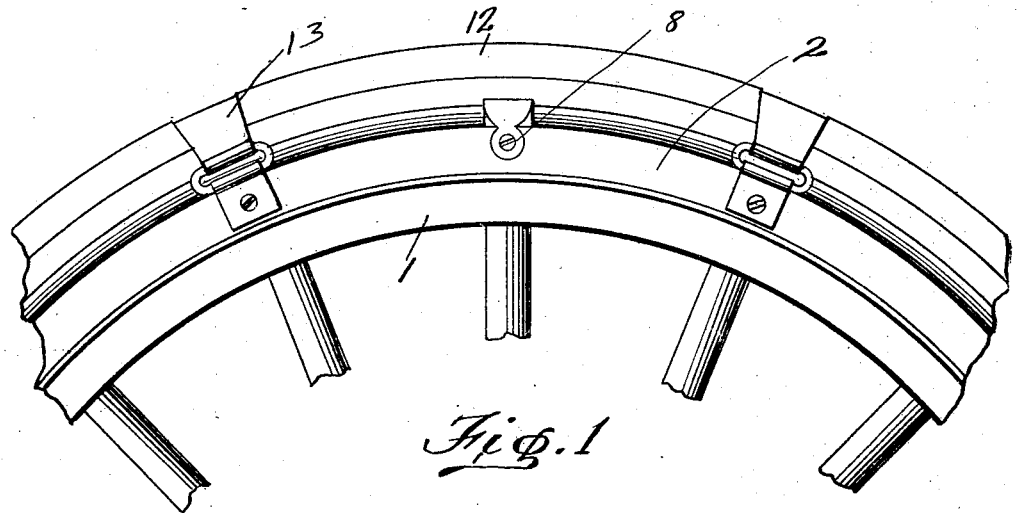
Fig.1
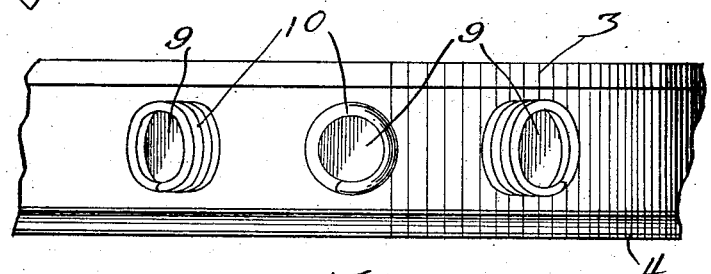
Fig.2
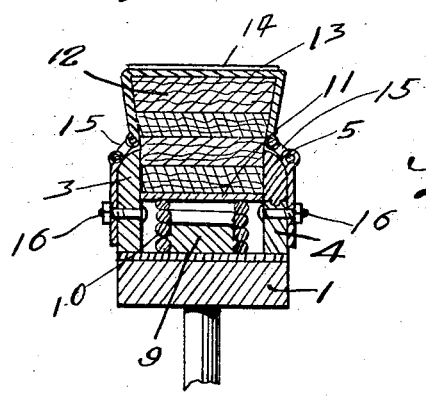
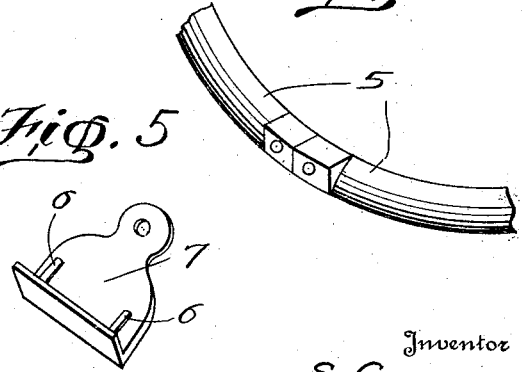
Inventor
S. CAMPBELL

UNITED STATES PATENT OFFICE.

SANDERS CAMPBELL, OF CARROLLTON, MISSISSIPPI.

RESILIENT WHEEL.

1,275,526.   Specification of Letters Patent.   Patented Aug. 13, 1918.

Application filed June 12, 1917. Serial No. 174,312.

*To all whom it may concern:*

Be it known that I, SANDERS CAMPBELL, a citizen of the United States, residing at Carrollton, in the county of Carroll, State of Mississippi, have invented certain new and useful Improvements in Resilient Wheels; and I do hereby declare the following to be a full, clear, and exact description of the invention, such as will enable others skilled in the art to which it appertains to make and use the same.

This invention relates to automobile wheels.

The invention has for its object to provide an automobile wheel in which the use of pneumatic tires is dispensed with, and in which, furthermore, the inventive part may be supplied as a unit for installation upon automobile wheels already in use. In this light, the invention is a rim supporting a cushioned tire, with means for removing the tire from the rim.

With the above objects in view, and such others relating to the details of construction as may hereinafter appear, my invention will now be fully set forth and described, reference being had to the accompanying drawings.

In the drawings:—

Figure 1 is a fragmentary side elevation of the wheel equipped with my invention, Fig. 2 is an enlarged detailed view showing, in plan, a portion of the inner rim structure, Fig. 3 is a perspective view of a portion of the locking rim, Fig. 4 is a transverse section through the rim and tire, and Fig. 5 is a perspective view of the locking device.

Referring more particularly to the drawings, 1 represents a wheel upon the felly of which is mounted the rim 2, in any suitable or customary manner not indicated herein which may be of a removable character. The rim 2 is in effect, a channel having a full flange 3 and a shorter flange 4 upon the opposite side, the latter being marginally grooved to receive a locking ring 5. The ends of the locking ring are provided with heads which are radially bored to receive the lugs 6 of a locking plate 7, the latter overlying the outer face of the flange 4 and receiving therein the locking bolt 8. The bottom or web of the rim 2 has rising therefrom a series of spaced posts 9 which carry the corresponding number of coil springs 10, the latter being turned onto shallow threads on the posts, and being of such height that they do not extend above the free edge of the flange 4.

The free ends of the coil springs 10 provide a continuous resilient support for a secondary rim 11 which is an integral part of the tire structure 12. The rim 11 is a continuous flat band of suitable metal body, and has mounted thereon successive layers of reinforced rubber structure or other material which will provide a suitable traction tread. The secondary rim 11 is of such width that it will freely ride between the flanges of the rim 2 when seated upon the coil springs 10, and the layers of material directly adjacent the rim 11 are also of this width, but the outer layers of tread material are widened, so as to overlie, or overhang the flanges 3 and 4.

The tire structure is prevented from slipping or traveling on the springs 10 by means of a number of retaining bands 13 which pass across the tread of the tire in transverse grooves 14, so that they will lie flush with the tread surface. Upon the sides of the tire, the bands 13 have the interposed loops or links 15 which provide for the expansion and contraction of the springs 10. The ends of the bands 13 are secured to the flanges 3 and 4 of the rim by means of suitable fastening bolts 16.

From the foregoing description, it will be apparent that I have provided an automobile wheel of very simple character which not only dispenses with the usual pneumatic tire, but provides an adequate substitute for the combination of tire and demountable rim which it is now the practice to carry on an automobile in order to replace a tire which has blown out or been punctured.

What I claim as my invention is:—

1. In an automobile wheel, the combination with the wheel structure, of a rim having outwardly extending marginal flanges, one of said flanges being of less height than the other and having a marginal groove, a locking ring seated on the margin of the grooved flange within said groove, a plurality of coil springs mounted upon the rim, a secondary rim seated upon the springs and between the flanges, removal of the locking ring permitting the removal of the secondary rim, and a tire structure on said rim.

2. In an automobile wheel, the combination with the wheel structure, of a rim having outwardly extending marginal flanges, one of said flanges being of less height than the other and having a marginal groove, a locking ring associated with the grooved flange, a plurality of coil springs mounted upon the rim, a secondary rim seated upon the springs and between the flanges, removal of the locking ring permitting the removal of the secondary rim, a tire structure on said rim, and means secured to the rim for preventing relative annular movement of the rim on the springs.

3. In a wheel structure, the combination of a rim having outwardly extending flanges, one of said flanges being of less height than the other and also having a marginal groove, and a locking ring seated in said groove, said locking ring having abutting ends, and a right angular lock plate, one face of the lock plate having inwardly extending lugs socketed into the abutting ends of the ring and means fastening the other face to the rim flange to secure the plate in locking position.

In testimony whereof I affix my signature in the presence of two witnesses.

SANDERS CAMPBELL.

Witnesses:
G. T. LEE,
J. T. ALLEN.

Copies of this patent may be obtained for five cents each, by addressing the "Commissioner of Patents, Washington, D. C."